United States Patent [19]

Washburn et al.

[11] Patent Number: 4,929,505

[45] Date of Patent: May 29, 1990

[54] CARBON-CARBON COMPOSITE STRUCTURAL ASSEMBLIES AND METHODS OF MAKING THE SAME

[75] Inventors: Robert M. Washburn, Santa Clara; Jerry D. Dodson, Fremont, both of Calif.

[73] Assignee: Acurex Corporation, Mt. View, Calif.

[21] Appl. No.: 947,760

[22] Filed: Dec. 30, 1986

[51] Int. Cl.$^5$ ............................................. B32B 9/00
[52] U.S. Cl. ............................. 728/408; 10/27 R; 411/904; 411/511; 156/92; 156/327; 156/337; 428/52; 428/223; 428/137; 428/212
[58] Field of Search ............... 428/408, 223, 52, 137, 428/212; 411/378, 427, 501, 511, 531, 548, 904; 156/91, 92, 60, 152, 326, 327, 337; 10/27 R

[56] References Cited

U.S. PATENT DOCUMENTS

| | | | |
|---|---|---|---|
| 3,764,446 | 10/1973 | Martin | 428/52 |
| 4,010,519 | 3/1977 | Worthing | 411/501 X |
| 4,109,435 | 8/1978 | Loyd | 428/408 X |
| 4,387,130 | 6/1983 | See | 428/52 X |
| 4,395,299 | 7/1983 | Riggs et al. | 156/337 X |
| 4,478,544 | 10/1984 | Strand | 411/501 X |
| 4,556,591 | 12/1985 | Bannink, Jr. | 428/408 X |
| 4,623,290 | 11/1986 | Kikuzawa et al. | 411/908 X |
| 4,717,302 | 1/1988 | Adams et al. | 411/378 |
| 4,778,637 | 10/1988 | Adams et al. | 10/27 R X |

OTHER PUBLICATIONS

H. O. Davis, "Secondary Bonding of Carbon/Carbon Composites", vol. 16, no. 6, 1979, pp. 432–435.

Primary Examiner—Ellis P. Robinson
Assistant Examiner—Susan S. Rucker
Attorney, Agent, or Firm—Flehr, Hohbach, Test, Albritton & Herbert

[57] ABSTRACT

Various methods of fixedly connecting together carbon-carbon composite structures are disclosed herein along with the ultimately connected structural assemblies. These assemblies for the most part consist only of the carbon-carbon composite structures and a char forming material such as pitch which has been charred and do not require fastening means made of any other type of material such as metal bolts or the like. As a result, each of these assemblies, in its entirety, is especially suitable for use in high temperature environments including specifically hyperthermal environments.

34 Claims, 3 Drawing Sheets

CARBON-CARBON COMPOSITE STRUCTURAL ASSEMBLIES AND METHODS OF MAKING THE SAME

The present invention relates generally to carbon-carbon composite structures and more particularly to various methods of attaching these structures together.

It is well known that carbon-carbon composite structures (which will be defined hereinafter) are relatively economical components for use in heated environments including those which reach hyperthermal temperatures. However, the fastening techniques utilized heretofore in connecting together different carbon-carbon composite structures to form an ultimate structural assembly have not been entirely compatible with this type of high temperature environment. Certainly conventional steel bolts, rivets and the like are not suitable for use in such environments. To this end, a variety of metal attachment techniques have been suggested such as HASTELOY X rivets which have been evaluated for attaching ICONEL 625 k Carbon-carbon composite structures. The high temperature shear strengths are relatively low, the insertion depth of the rivets are critical, and the carbon in the carbon-carbon composite structures reacts adversely with the rivets at elevated temperatures.

Since it is known that a rocket exit cone made entirely of carbon-carbon composite structural material can be successfully attached to a rocket nozzle assembly made of the same material by threading the exit cone into a cooperating threaded opening in the assembly, consideration has been given to providing bolts and screws constructed entirely of carbon-carbon composite structural material for use in fixedly connecting together structures of the same material. However, while the large threads on a rocket cone (which is relatively large in diameter) have sufficient carbon fibrous reinforcing material within the threads to withstand the shear forces to which the exit cone is subjected, bolts and screws are far too small to include sufficient fibrous reinforcing material unless they are made in accordance with the present invention, as will be discussed hereinafter.

In view of the foregoing, it is an object of the present invention to provide a method of fixedly connecting together two or more carbon-carbon composite structures for ultimate use in hyperthermal environments in an uncomplicated and reliable manner.

A more particular object of the present invention is to provide a method of fixedly connecting together carbon-carbon composite structures with the aid of char forming material and pressure. Preferably internal pressure rather than externally applied pressure, whereby carbon-carbon composite structures of relatively complex shapes can be fixedly connected together in relatively uncomplicated and reliable ways.

Another particular object of the present invention is to provide an uncomplicated and reliable method of making bolts and screws out of carbon-carbon composite structural material and yet provide these bolts and screws with the necessary shear strength suitable for connecting relatively large composite structures together and for connecting together in a slip joint fashion a carbon-carbon composite structure with a second structure having a different thermal coefficient of expansion.

Still another particular object of the present invention is to provide an overall structural assembly including a carbon-carbon composite structure, a structure having a different thermal coefficient of expansion than the carbon-carbon structure and bolts of the type just recited for connecting the two structures together in a slip joint fashion.

Yet another particular object of the present invention is to provide a rivet assembly comprised essentially of carbon-carbon composite structural material and charred material and a method of making the same in an uncomplicated and reliable fashion.

For purposes herein, a carbon-carbon composite structure is defined as the combination of carbon-based reinforcements impregnated with a char forming material and then subjected to carbonizing temperatures (about 500° C. to about 1500° C.) and/or graphatizing temperatures (about 2000° C. to about 3000° C.). The reinforcements can be a carbon-based fiber, mat, ribbon, fabric or the like derived from PAN (Polyacrylonitrile) based fibers, rayon based fibers or pitch based fibers. The char forming material can be an organic resin such as phenolic resin, Polybenzimidazole (PBI) resin or the like or a pitch. However, it is preferable to use pitch as the char forming material as it has been found that carbon-carbon composite structures which utilize pitch have a greater resiliency than do composite structures which utilize, for example, phenolic resin. As will be seen hereinafter, this resiliency is important to the present invention.

Still defining the carbon-carbon composite structure, it should be noted that the ultimately formed structure may be made of a number of individual substrates or "prepregs" of carbon based reinforcements which are impregnated with char forming material and laminated together using a variety of known laminating processes to provide a desired thickness and volume. This laminate is then heated to cause the char forming impregnate to char and thereby produce a laminant having carbonatious char dispenses throughout with fibrous reinforcement. The product can be reimpregnated and recarbonized or heated at till higher temperatures to effect graphitization. Thereafter, this ultimate product can be machined or otherwise acted upon to provide the shape of the carbon-carbon composite required for structure application.

In general, carbon-carbon composite structures can be fabricated using essentially any type of carbon-base fiber reinforcement and a compatible char forming material, preferably a pitch, as stated above, derived either from coal tar or petroleum.

Having defined what is meant by a carbon-carbon composite structure, it will be seen hereinafter how the foregoing objects are achieved. For the moment, it suffices to say that one aspect of the present invention involves fixedly connecting together first and second carbon-carbon composite structures along predetermined first and second surface segments of the structures, respectively, by first configuring the structures such that the surface segments engage one another in a compression fitted fashion without the continued use of external force. At least one of these surface segments is coated with a char forming material, for example pitch, and then the surface segments are caused to engage one another in this compression fitted fashion with the char forming material therebetween. Thereafter, both surface segments and the char forming material are subjected to a heated environment sufficient to char the char forming material, whereby this fixedly connects the structures together.

The method just recited is suitable for providing a number of different carbon-carbon composite structural assemblies and for making bolts and screws out of carbon-carbon structural material and charred material only. Moreover, by providing bolts of this type, it is possible to successfully provide slip joints and other such connections which compensate for thermal expansion and contraction between a carbon-carbon composite structure and a structure having a different thermal coefficient of expansion.

The various aspects of the present invention will be discussed in more detail hereinafter in conjunction with the drawings wherein.

Figure 1:
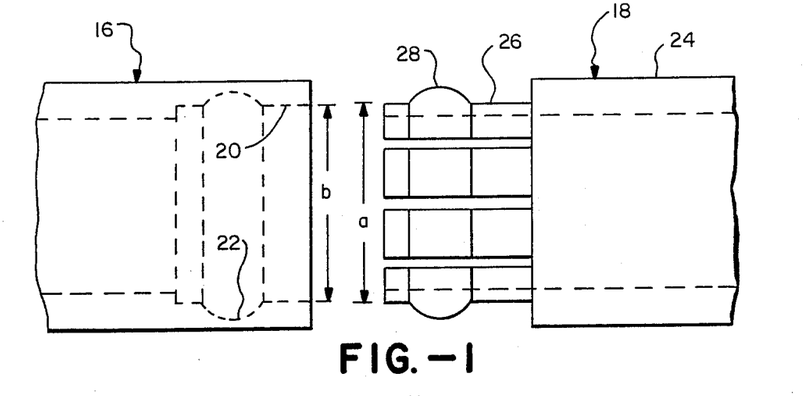
FIG. 1 diagrammatically illustrates the end sections of two carbon-carbon composite structures designed in accordance with the present invention.

Turning now to the drawings, wherein like components are designated by like reference numerals throughout the various figures, attention is first directed to FIG. 1 which illustrates the end sections 16 and 18 of two carbon-carbon composite structures to be fixedly connected together. The end section 16 is cylindrical in outer configuration and includes an axially extending blind opening 20 extending into its free end. The blind opening is cylindrical in cross sectional configuration and is enlarged at 22 along a section thereof. End section 18 also includes externally cylindrical section 24 and a plurality of circumferentially spaced splines 26 having enlargement 28 extending axially out from section 24. The diameter of cylindrical opening 20, indicated at b, is slightly smaller than the diameter defined by the combination of splines 26, indicated at a. The diameter across the enlarged section 22 of opening 20 is preferably slightly smaller than the diameter across the enlarged sections 28 of splines 26.

The end sections 16 and 18 described above can be made in any suitable manner. For example, they can be fabricated using a plurality of plys of prepreg substrates impregnated with a char forming material, preferably petroleum pitch. The impregnated fabric is wrapped around a mandrel and heated to a sufficient temperature to carbonize the pitch. The mandrels are then removed and the carbonized tubes are graphitized. The tubes are then machined and ground to provide end sections 16 and 18. By using pitch as the char forming material, the splines 26 are sufficiently resilient to be easily forced into openings 20 without breaking. Thus, by doing this, the axially extending internal surface defining opening 20 in end section 16 and the combined external surface formed by all of the splines 26 engage one another in a compression fitted fashion without the continued use of external force.

In accordance with the present invention, before splines 26 are forced into opening 20, the axially extending external surfaces of the spline and/or the internal surface of opening 20 are coated with a char forming material, for example pitch, and then the splines are forced into the opening, as illustrated in FIG. 3. The char forming coating is shown at 30. Once this has been done, the joined end sections and the char forming material are subjected to a heated environment, generally represented by arrow H, for example an oven (or even a laser or a blow torch or the like can be used), sufficient to char the char forming material. To accomplish this, the end sections and char forming materials are subjected to a temperature environment of approximately 500° C. to as high as 2200° C. or above with, for example, a laser.

The method just described for fixedly connecting together the end sections 16 and 18 of carbon-carbon composite structures is uncomplicated and reliable. It is based on the recognition that the splines 26 are sufficiently resilient to fit within opening 20 in a compression fitted fashion without breaking even though these splines are made of carbon-carbon composite material.

Referring to FIGS. 4A, 4B and 4C, different carbon-carbon composite structures are illustrated, each including a plurality of openings 20 having enlarged sections 22. The structure illustrated in FIG. 3A and indicated at 32A is triangular in configuration and includes an opening 20 in each of its three major sides. The structure illustrated in FIG. 3B and indicated at 32B is rectangular in cross sectional configuration and includes an opening 20 in each of its sides. Finally, the carbon-carbon structure illustrated in FIG. 3C and indicated at 32C is circular in cross section and also includes four openings 20, equally circumferentially spaced apart from one another. The connectors shown in FIGS. 3A, B and C illustrate openings 20 uniformly spaced. The spacing can vary as determined by structural design requirements to join two or more carbon-carbon composite structural members. Each of these composite structures is configured to receive in a fixedly connected fashion a plurality of end sections 18 in the manner described above. Thus, a series of carbon-carbon composite structures of the type shown in FIGS. 3A-3C can be interconnected together to form an overall structural assembly. The structures 32 are machined or otherwise formed into the shapes illustrated and provided with the openings 20.

Figure 3A:
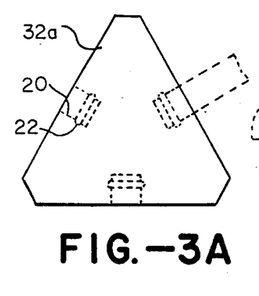
FIGS. 3A–3C diagrammatically illustrate another carbon-carbon composite structure designed in accordance with the present invention for connection with a number of carbon-carbon composite structures having end sections corresponding to one of the end sections of FIG. 1.
Figure 3B:
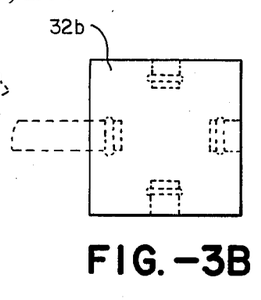
Figure 3C:
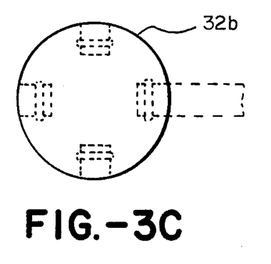

It will be recognized by those skilled in the art that the structures 32A, 32B and 32C illustrate fixedly connected end sections in only two dimensions. However, multifaceted structures can be used to fixedly connect a plurality of end sections 18 in three dimensions. For example, a pyramid-shaped 32 would allow the attachment of five end sections 18, a cubic-shaped 32 would allow the attachment of six end sections 18, a sphere would allow the attachment of numerous end sections 18, the number being limited only by the space available.

Figure 4:
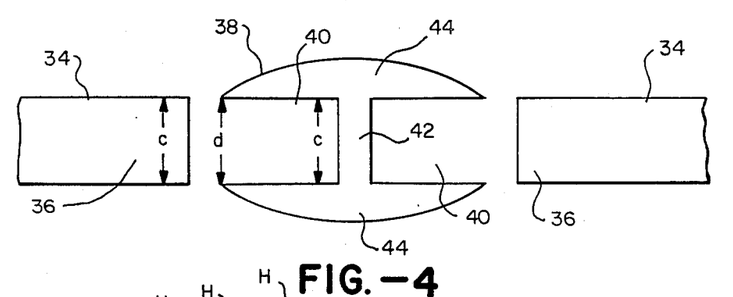
FIG. 4 diagrammatically illustrates a pair of carbon-carbon composite structures in the form of substrates and a carbon-carbon composite structure in the form of a member adapted to interconnect the two substrates together.
Figure 5:
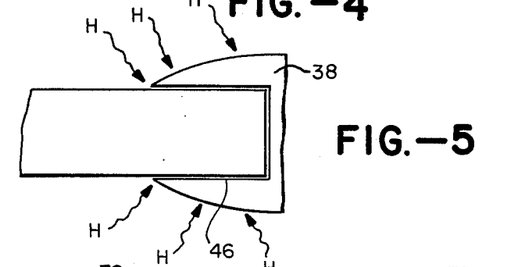
FIG. 5 diagrammatically illustrates how one of the substrates of FIG. 4 is interconnected with the interconnecting member of FIG. 5.

Turning now to FIGS. 4 and 5, attention is directed to a method of fixedly connecting together carbon-carbon composite structures in the form of substrates 34 having edge sections 36. To this end, a carbon-carbon composite structural member 38 machined or otherwise formed into the shape illustrated in FIG. 4 is provided. This member extends longitudinally the length of edge sections 36 and defines opposing longitudinally extending channels 40. A central web 42 separates these channels and opposing top and bottom sides 44 define the lateral extent of the channels.

Figure 2:
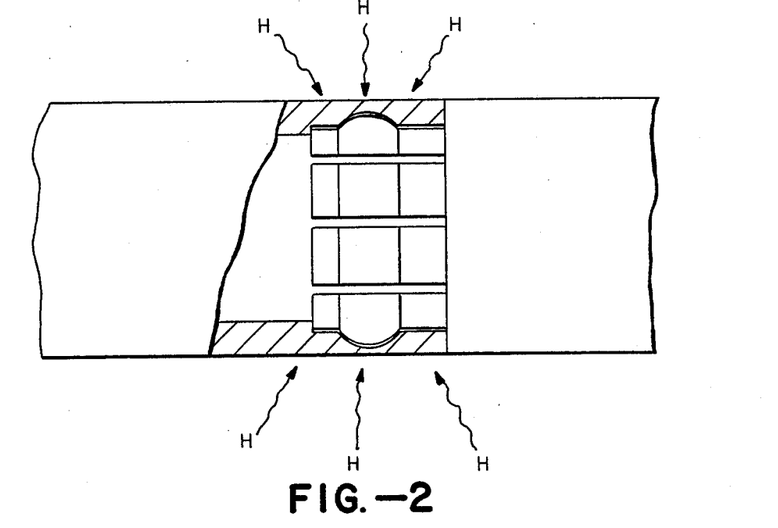
FIG. 2 diagrammatically illustrates how the end sections of the structures of FIG. 2 are interconnected together.

As illustrated in FIG. 4, the depth C of each channel at the web 42 is equal to the thickness of end section 36 of each substrate 34. At the same time, the depth D of each channel at its outermost end is slightly less than the depth C and thus the side walls of each channel taper outwardly from its opening to the web. For example, the dimension D is generally 0.001 to 0.005 inch less than dimension D. The actual dimensions will depend upon the design requirements. These dimensions are selected so as to allow end sections 36 to be forced into channels 40 so that their confronting surfaces engage one another in compression fitted fashion in the same manner described with regard to FIGS. 1 and 2. However, before the end sections are actually forced into channels 40, their external surfaces are coated with a char forming material, for example pitch, and/or the surfaces defining channels 40 are so coated. This coating is shown at 46 in FIG. 6. Thereafter, the end sections, coupling member 38 and coating 46 are subjected to the char forming environment (including heat H) discussed above with respect to FIGS. 1 and 2.

Figure 8:
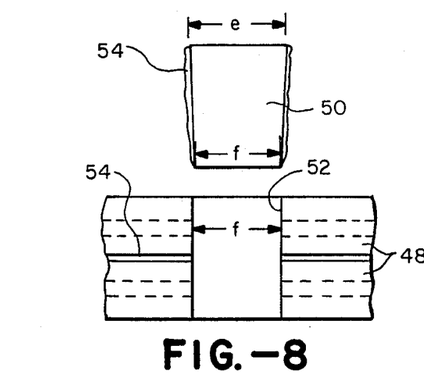
FIG. 8 diagrammatically illustrates yet another pair of carbon-carbon composite structures designed in accordance with the present invention.

Turning now to FIG. 8, a technique is shown for fixedly connecting together a pair of carbon-carbon composite structures in the form of substrates 48 using a third carbon-carbon substrate 50 in the shape of a tapered pin. The substrates 48 are shown on top of one another with a common opening 52 having a circular cross section of diameter F. The pin 50 also has a circular cross section and tapers outwardly from a lower diameter F (equal to a diameter of opening 52) to a maximum diameter E which is slightly greater than diameter F. The diameters E and F will be determined by the design requirements. The taper angle of the taper pin must be larger for thin substrates 48 than for thick substrates. For example, the taper angle can be up to 30° for substrate 48 having thickness of 0.010 and 5° for substrate 48 having thicknesses of 0.100 or higher. As a result of the taper, the pin 50 may be forced into opening 52 so that the axially extending external surface of the tapered pin engages the axially extending cylindrical surface defining opening 52 in a compression fitted fashion. Like in the previous embodiment, before pin 50 is inserted into opening 52 a coating of char forming material is coated over the axially extending outer surface of the pin, as shown at 54 and/or such a coating is provided over the surface defining opening 52. Thereafter, the pin is provided in opening 52 with the char forming coating therebetween, the char forming material is charred in the manner discussed above. In this regard, it may be desirable to provide a layer of 54 of char forming material between the substrates 48 at the same time and subject this layer to sufficient heat to char it.

Figure 9:
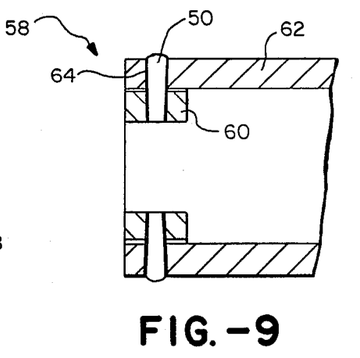
FIG. 9 diagrammatically illustrates still further carbon-carbon composite structures designed in accordance with the present invention and shown interconnected together in accordance with the present invention.

Both the substrates 48 described above and the tapered pin 50 may be formed in a suitable manner. If the substrates 48 are made in the laminated fashion described previously with the layers of each laminate extending horizontal, as indicated by the dotted horizontal lines in FIG. 8, it may be desirable to form tapered pin 50 from a carbon-carbon composite structure in the form of a laminate with the layers extending vertically, as indicated by the vertically extending dotted lines in FIG. 8. This strengthens the joint between the substrates and tapered pin. A series of tapered pins 50 can be used to fixedly connect a carbon-carbon composite structure in the form of a ring to the inside surface of a complimentary cylinder. FIG. 9 illustrates such an assembly which is generally indicated at 58. The ring is indicated at 60 and the cylinder at 62. The charred layer between the pin and both the ring and cylinder is shown at 64. While not shown, the layer of charred material can be provided between the ring and the cylinder in the same manner as charred layer 56.

Figure 6:
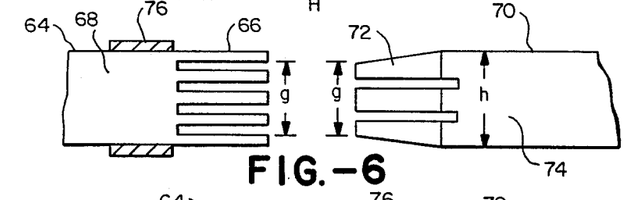
FIG. 6 diagrammatically illustrates still another pair of carbon-carbon composite structures designed in accordance with the present invention.
Figure 7:
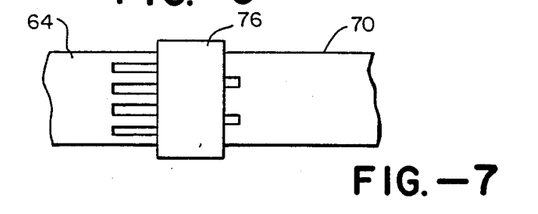
FIG. 7 diagrammatically illustrates how the structures of FIG. 6 actually interconnect together.

Turning now to FIGS. 6 and 7, attention is directed to the way in which a universal joint is made from carbon-carbon composite structures. In FIG. 6, the end section 64 of a carbon-carbon composite tube is illustrated. This end section includes a plurality of equally circumferentially spaced splines 66 extending axially outwardly from a continuously cylindrical segment 68 of the end section. These splines together define a radially inwardly facing cylindrical surface having a diameter G. FIG. 6 also shows a section of a second carbon-carbon composite tube. This latter end section which is generally indicated by the reference numeral 70 includes its own series of axially extending, equally circumferentially spaced splines 72 extending outwardly from a continuous cylindrical section 74. As illustrated in FIG. 6, the splines 72 taper inwardly from segment 74 to define a tapering outer surface. The maximum outer diameter of this latter surface is indicated at H and the minimum diameter is equal to the opening into the spline 66, as indicated at G. The dimension G is generally 0.001 to 0.005 inches less than dimension H.

With end sections 64 and 70 configured in the manner described immediately above, the insertion of splines 72 into splines 66 cause the former to resiliently contract inward and, the latter to resiliently expand outward. Thus, the combined inner surface of splines 66 and the combined outer surface of spline 72 are placed into engagement with one another in a compression fitted fashion. In order to provide an even tighter fitting, a ring 76 of carbon-carbon composite material is fitted around end section 64 so as to readily slide along the latter so long as splines 72 are not disposed within spline 66. With the splines 72 within spline 66, the ring 76 must be forced into position over the spline 66. This, in turn, results in a greater degree of compression between the adjoining spline surfaces and also places the internal surfaces of the ring and the external surfaces of spline 66 in engagement with one another in a compression fitted fashion. These three components are fixedly connected together by first providing a char forming coating (not shown) between the splines 66 and 72 and between the splines 66 and ring 76 and then causing the char forming material to char, as discussed previously. The ultimately formed assembly is illustrated in FIG. 6.

Figure 10:
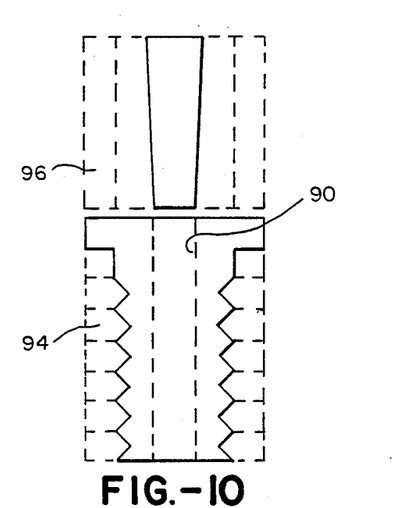
FIG. 10 diagrammatically illustrates how a bolt made only from carbon-carbon composite material and char forming material is made in accordance with the present invention.
Figure 11:
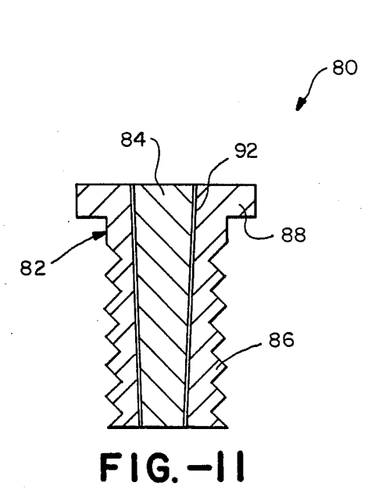
FIG. 11 diagrammatically illustrates a bolt made from the method as illustrated in FIG. 10.
Figure 12:
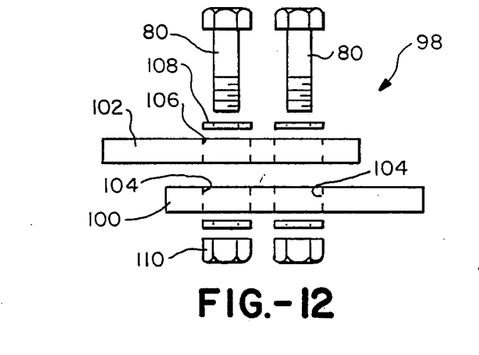
FIG. 12 and 13 diagrammatically illustrate a structural assembly designed in accordance with the present invention and including a carbon-carbon composite structure in the form of a substrate and a second substrate having a thermal coefficient of expansion different than the carbon-carbon composite substrate the two being interconnected in a slip joint fashion by means of bolts of the type illustrated in FIG. 11.

Referring now to FIGS. 10 and 11, attention is directed to a technique for making a bolt out of carbon-carbon composite material and char forming material only, in accordance with the present invention. The end product, that is, the finished bolt is shown in FIG. 12 at 80. This bolt includes a main body 82 and a tapered pin 84, each of which is constructed entirely of carbon-carbon composite material. The main body 82 has an externally threaded shank 86 with an enlarged head 88 formed at one end thereof. A through hole 90 (see FIG. 10) extends axially through shank 86 and head 88. Tapered pin 84 is designed to fit within opening 90 in a compression fitted manner and a layer of charred material, for example charred pitch 92, is provided between the tapered pin and the surface of main body 82 defining opening 90.

FIG. 10 diagrammatically illustrates how the bolt of FIG. 11 is preferably constructed. Initially, a block of carbon-carbon composite material generally indicated by dotted lines at 94 is provided and the bolt body is machined from this block and the opening 90 is drilled, machined or otherwise provided therein. The tapered pin 84 is machined in a similar manner from a block of carbon-carbon composite material generally indicated by dotted lines at 96. In the case where block 94 is itself formed from a series of laminated sections extending in, for example, the horizontal direction, as indicated by dotted lines in FIG. 11, it is preferable to form tapered pin 84 from a block which itself is made of vertically extending laminated sections, also indicated by dotted lines. In other words, if the ultimately produced bolt body 82 is formed from a series of horizontally extending laminated sections, the tapered pin preferably should be formed in a way to provide vertically extending laminated sections. If blocks 94, 96 are not formed from laminated sections but if the fibers making up these blocks are unidirectional, it would still be important to provide the separate tapered pin so that its fibers extend in a direction normal to the direction of the fibers in the bolt body.

Once bolt body 82 and tapered pin 84 are provided, the axially extending external surface of the latter is coated with char forming material such as pitch and/or so is the internal surface of body 82 defining opening 90. Thereafter, the pin is force fitted into the opening and the char forming coating is charred to provide previously described layer 92. As a result, the bolt includes sufficient shear strength in both the axial and cross directions for its intended purpose, that is, in hyperthermal environments for interconnecting together relatively large carbon-carbon composite structures.

Figure 13:
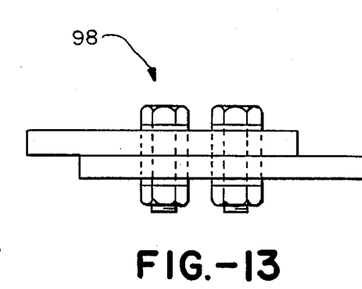

The bolt 80 just described is especially suitable for use in connecting together a carbon-carbon composite structure within a dissimilar structure having a different thermal coefficient of expansion. This is best exemplified in FIGS. 12 and 13 which show an overall structural assembly 98 in unassembled form (FIG. 12) and in assembled form (FIG. 13). This assembly includes a carbon-carbon composite structure in the form of a substrate 100 and a second dissimilar substrate 102 having a different thermal coefficient of expansion, for example a ceramic substrate. These two substrates include pairs of vertically aligned openings 104 and 106, respectively. These openings are preferably oval or elliptical in configuration and, in any event, are larger in at least one direction than the shanks 86 of the previously described bolt 80. The two substrates are interconnected together by means of two bolts 80, cooperating washers 108 and cooperating nuts 110. The washers and nuts are preferably constructed of carbon-carbon composite material which are machined to the required shape. The bolt, nuts and washers are interconnected in the manner illustrated in FIG. 13 in order to connect the two substrates together. The substrates are allowed to expand and contract relative to one another because of the enlarged openings 104 and 106. Nevertheless, there is a certain degree of shear applied to the shanks of the bolts as a result of this relative movement. However, each of these bolts is reinforced against these type of forces by its tapered pin 84 (see FIG. 11).

The foregoing has been a description of a number of different structural assemblies constructed primarily of carbon-carbon composite material. In all cases illustrated, at least first and second carbon-carbon composite structures are fixedly connected together along predetermined first and second surface segments of these structures, respectively. These structures are configured such that the surface segments are able to engage one another in a compression fitted fashion without the continued use of external force. In each case, at least one of the surface segments is coated with a char forming material and then the surface segments are caused to engage one another in the compression fitted fashion just mentioned with the char forming material therebetween. Thereafter, the char forming material is heated sufficient to cause it to char and thereby provide a fixed connection between the two structures. In the embodiment of FIGS. 1 and 3, the axially extending inner surface of end section 16 defining opening 20 and the external surfaces of splines 26 serve as these engaging surface segments. In the embodiment of FIGS. 4 and 5, the opposite sides of substrate end sections 36 and the opposite sides of channels 40 serve as these surface segments. In the embodiment illustrated in FIG. 8, the axially extending external surface of taper pin 50 and the internal surface defining the combined opening 52 serve as these surface segments. In the embodiment illustrated in FIGS. 6 and 7, the internal surfaces of splines 66 and the external surfaces of splines 72 serve as these surface segments. In the embodiment of FIGS. 10 and 11, the external surface of the tapered pin 84 and the internal surface of the bolt body defining opening 90 serve as these surfaces. The engaging surface segments of the other embodiments should be self explanatory.

Regardless of the embodiment, it is important that at least one of these two structural members is sufficiently resilient to provide the compression fit discussed above. It has been found that the use of pitch as the char forming material in the carbon-carbon composite structure is most beneficial to this end, although the present invention is not limited to its use so long as there is sufficient resiliency.

What is claimed is:

1. A method of fixedly connecting together first and second carbon-carbon composite structures along predetermined first and second segments of said structures, respectively, said method comprising the steps of:
   (a) configuring said structures such that at least one of said structures is sufficiently resilient so that said surface segments engage one another in a compression fitted fashion without the continued use of external force therefor, whereby to hold said structures together;
   (b) coating at least one of said surface segments with a char forming material;
   (c) causing said surface segments to engage one another in said compression fitted fashion with said char forming material therebetween; and
   (d) thereafter, subjecting said char forming material to a heated environment sufficient to char said char forming material, whereby this fixedly connects said structures together.

2. A method according to claim 1 wherein each said structures includes carbon base reinforcements impregnated with charred pitch and wherein said char forming material is pitch.

3. A method according to claim 1 wherein the surface segments of said first and second structures are generally cylindrical and complimentary to one another with the first surface segment of the first structure facing radially inward so as to receive the second surface segment of the second structure which face radially outward and which has a slightly greater maximum diameter than the minimum diameter of said first surface segment, at least one of said structure being sufficiently resilient so as to provide said compression fit when second surface segment is forced into said first surface segment.

4. A method according to claim 3 wherein said second structure includes a set of adjacent circumferentially spaced splines having outer surfaces which together defines said second surface segment.

5. A method according to claim 3 wherein said first structure includes a plurality of surface segments identical to said first surface segment at different locations and orientations relative to one another and wherein said second structure is tubular and includes an end section defining said second surface segment, whereby a plurality of structures identical to said second structure can be fixedly connected to said first structure.

6. A method according to claim 1 wherein said first structure includes an elongated, straight edge section having top and bottom surfaces which together serve as said first surface segment and wherein said second structure includes a channel complementary in shape to said edge section and having opposing surfaces which together serve as said second surface segment, said opposing surfaces having a minimum spacing therebetween which is slightly less than the thickness of said edge section and sufficiently resilient so as to provide said compression fit when said straight edge section is forced into said channel.

7. A method according to claim 6 wherein said second structure includes a second channel identical to said first channel for fixedly connecting together a second one of said first structures therewith.

8. A method according to claim 1 wherein said first structure includes a first tubular end section of circumferentially spaced splines having radially inwardly facing surfaces which together serve as said first surface segment and wherein said second structure includes a second tubular end section of circumferentially spaced splines having radially outwardly facing surfaces which together serve as said second surface segment, the latter having maximum diameter slightly greater than the minimum diameter of first surface segment, at least one of said end sections being sufficiently resilient so as to provide said compression fit when said second end section is forced into said first end section.

9. A method according to claim 8 including a third carbon-carbon composite structure in the form of a ring having a radially inwardly facing surface sized to slide loosely around said first end section of said first structure when said second end section is not forced into said first end section and to slide more tightly around said first end section after said second end section is forced into said first end section in order to aid in providing said compression fit, said method including the steps of forcing said ring around said first end section after said second end section has been forced into said first end section and providing char forming material between the ring and first end section and thereafter subjecting said ring and last-mentioned char forming material to said heated environment along with said first and second surface segments and said first mentioned char forming material.

10. A method according to claim 1 wherein said first structure includes two separate, unconnected carbon-carbon composite substructures positioned against one another and defining a common opening having an inner surface which serves as said first surface segment and wherein said second structure is in the form of an elongated taper pin having an outer axially extending surface serving as said second surface segment, the maximum cross-sectional configuration of said opening and at least one of said structures being sufficiently resilient so as to provide said compression fit when said taper pin is forced into said opening.

11. A method according to claim 10 wherein said substructures are substrates positioned against one another.

12. A method according to claim 10 wherein one of said substructures is a cylinder and the other is a ring disposed concentrically within and against said cylinder.

13. A method according to claim 1 wherein said first structure is in the shape of a bolt having an externally threaded shank and an opening extending axially into said shank, the axially extending surface of said opening serving as said first surface segment, and wherein said second structure is in the shape of an elongated taper pin having an outer axially extending surface which serves as said second surface segment and which has a maximum outer diameter greater than the diameter of said opening, at least one of said structures being sufficiently resilient so as to provide said compression fit when said taper pin is forced into said opening.

14. A structural assembly including first and second carbon-carbon composite structures fixedly connected together in accordance with the method recited in claim 1.

15. A structural assembly, comprising:
   (a) first and second carbon-carbon composite structures having predetermined first and second surface segments, respectively, at least one of said surface segments being sufficiently resilient such that said surface segments engage one another in a compression fitted manner without the aid of external forces, whereby to hold said structures together; and (b) a layer of charred material disposed between said surface segments for fixedly connecting said composite structures together, said charred material being the result of coating a char forming but uncharred material over at least one of said surface segments prior to engaging said surface segments to one another and after so engaging these surface segments subjecting the coated char forming material to a heated environment sufficient to char the material.

16. An assembly according to claim 15 wherein each of said structures includes carbon base reinforcements impregnated with charred pitch and wherein said charred material is charred pitch.

17. An assembly according to claim 15 wherein said first and second surface segments of said composite structures are generally cylindrical and complimentary to one another with the first surface segment of the first structure facing radially inward so as to receive the second surface segment of the second structure which faces radially outward and which has a slightly greater maximum diameter than the minimum diameter of said first surface segment, at least one of said structures being sufficiently resilient so as to provide said compression fit when said second surface segment is forced into said first surface segment.

18. An assembly according to claim 17 wherein said second structure includes a set of adjacent circumferentially spaced splines having outer surfaces which together define said second surface segment.

19. An assembly according to claim 15 wherein said first structure includes a plurality of surface segments identical to said first surface segment at different locations and orientations relative to one another and wherein said second structure is tubular and includes an end section defining said second surface segment, whereby a plurality of structures identical to said second structure can be fixedly connected to said first structure.

20. An assembly according to claim 15 wherein said first structure includes an elongated straight edge section having top and bottom surfaces which together serve as said first surface segment and wherein said second structure includes a channel complimentary in shape to said edge section and having opposing surfaces which together serve as said second surface segment, said opposing surfaces having a minimum spacing therebetween which is slightly less than the thickness of said edge section and sufficiently resilient so as to provide said compression fit when said straight edge section is forced into said channel.

21. An assembly according to claim 20 wherein said second structure includes a second channel identical to said first channel for fixedly connecting together a second one of said structures therewith.

22. An assembly according to claim 15 wherein said first structure includes a first tubular end section of circumferentially spaced splines having radially inwardly facing surfaces which together serve as said first surface segment and wherein said second structure includes a second tubular end section of circumferentially spaced splines having radially outwardly facing surfaces which together serve as said second surface segment, the latter having a maximum diameter slightly greater than the minimum diameter of said first surface segment, at least one of said end sections of said composite structures being sufficiently resilient so as to provide said compression fit when said second end section is forced into said first end section.

23. An assembly according to claim 22 including a third carbon-carbon composite structure in the form of a ring having a radially inwardly facing surface sized to slide loosely around said first end section of said first structure when said second end section is not forced into said first end section and to slide more tightly around said first end section after said second end section is forced into said first end section in order to aid in providing said compression fit, said ring being disposed around the second end section and the first end section, and a charred material disposed between said ring and said second end section.

24. An assembly according to claim 15 wherein said first structure includes two separate, unconnected carbon-carbon composite substructures positioned against one another and defining a common opening having an inner surface which serves as said first surface segment and wherein said second structure is in the form of an elongated taper pin having an outer axially extending surface serving as said second surface segment, the maximum cross sectional configuration of the outer surface of said pin being slightly greater than the cross sectional configuration of said opening and at least one of said structures being sufficiently resilient so as to provide said compression fit when said taper pin is forced into said opening.

25. An assembly according to claim 24 wherein said substructures are substrates positioned against one another.

26. An assembly according to claim 24 wherein one of said substructures is a cylinder and the other is a ring disposed concentrically within and against said cylinder.

27. An assembly according to claim 15 wherein said first structure is in the shape of a bolt having an externally threaded shank and an opening extending axially into said shank, the axially extending surface of said opening serving as said first surface segment, and wherein said second structure is in the shape of an elongated taper pin having an outer axial extending surface which serves as said second surface segment and which has a maximum outer diameter greater than the diameter of said opening, at least one of said structures being sufficiently resilient so as to provide said compression fit when said taper pin is forced into said opening.

28. A method of making a bolt having an externally threaded shank and comprising substantially entirely of carbon-carbon composite structural material, said method comprising the steps of:

(a) providing a carbon-carbon composite structure in the shape of a block;

(b) machining said carbon-carbon composite structural block into the shape of said bolt with a continuous opening extending axially through its shank, said opening having a circular cross section of a given diameter;

(c) providing a tapered pin of carbon-carbon composite structural material such that the maximum cross sectional diameter of said pin is slightly greater than the diameter of said opening;

(d) coating the axially extending outer surface of said tapered pin and/or the axially extending inner surface of said opening with a char forming material;

(e) thereafter, forcing said pin into said opening so as to cause at least axially extending sections of said surfaces to engage one another in a compression fitted fashion with said char forming material therebetween; and (f) after said tapered pin has been forced into said opening, subjecting said char forming material to heat sufficient to char said char forming material.

29. A bolt, comprising:
(a) A bolt body including an axially extending, externally threaded shank and an enlarged head at one end of said shank, said body being formed in its entirety of carbon-carbon composite structural material and having a through hole extending axially through said head and said shank;
(b) a tapered pin disposed within said through hole in a compression fitted fashion, said pin being constructed in its entirety of carbon-carbon composite structural material; and
(c) a coating of charred material disposed between the outer axially extending surface of said pin and the internal surface of said bolt body defining said through hole.

30. A bolt according to claim 29 wherein said charred material is a result of coating the external surface of said pin and/or the internal surface of said bolt body defining said through hole with a char forming material before the pin is inserted into said opening and thereafter subjecting said char forming material to a heat sufficient to char said char forming material.

31. A bolt according to claim 30 wherein said char forming material is pitch.

32. A structural assembly comprising:
(a) a first substrate constructed in its entirety of carbon-carbon composite structural material, said substrate having a through hole;
(b) a second substrate constructed of a material other than carbon-carbon composite structural material and having a different thermal coefficient of expansion than said first substrate, said second substrate having a through hole; and
(c) means for interconnecting together said first and second composite structures in a way which allows them to move relative to one another as a result of thermal expansion and contraction, said interconnecting means including a bolt constructed substantially entirely of carbon-carbon composite structural material, said bolt including a shank which extends through and has a cross-sectional configuration smaller than both of said through holes, and a nut constructed entirely of carbon-carbon composite structural material connected to the bolt in a way which fixedly connects said first and second substrates together while allowing said relative expansion and contraction of the two.

33. A method according to claim 28 including the step of providing said bolt-shaped block with external threads.

34. A bolt, comprising:
(a) a bolt body including an axially extending, shank and an enlarged head at one end of said shank, said body being formed in its entirety of carbon-carbon composite structural material and having a through hole extending axially through said head and said shank;
(b) a tapered pin disposed within said through hole in a compression fitted fashion, said pin being constructed in its entirety of carbon-carbon composite structural material; and
(c) a coating of charred material disposed between the outer axially extending surface of said pin and the internal surface of said bolt body defining said through hole.

* * * * *